US012495255B2

(12) United States Patent
Shu et al.

(10) Patent No.: US 12,495,255 B2
(45) Date of Patent: Dec. 9, 2025

(54) METHOD, APPARATUS AND SYSTEM FOR TESTING A BONE CONDUCTION COMMUNICATION DEVICE

(71) Applicant: GOERTEK INC., Shandong (CN)

(72) Inventors: Kaifa Shu, Shandong (CN); Kang An, Shandong (CN); Xiaofeng Wang, Shandong (CN); Jie Wu, Shandong (CN); Feifei Han, Shandong (CN); Zongxia Zhu, Shandong (CN); Zheng Yang, Shandong (CN); Dingyun Li, Shandong (CN); Chao Xie, Shandong (CN); Xuewen Zhou, Shandong (CN)

(73) Assignee: GOERTEK INC., Weifang (CN)

( * ) Notice: Subject to any disclaimer, the term of this patent is extended or adjusted under 35 U.S.C. 154(b) by 332 days.

(21) Appl. No.: 18/044,946

(22) PCT Filed: Oct. 31, 2020

(86) PCT No.: PCT/CN2020/125634

§ 371 (c)(1),
(2) Date: Mar. 10, 2023

(87) PCT Pub. No.: WO2022/052257

PCT Pub. Date: Mar. 17, 2022

(65) Prior Publication Data

US 2023/0370788 A1 Nov. 16, 2023

(30) Foreign Application Priority Data

Sep. 11, 2020 (CN) ......................... 202010953883.3

(51) Int. Cl.
*H04R 25/00* (2006.01)

(52) U.S. Cl.
CPC ....... *H04R 25/305* (2013.01); *H04R 2460/13* (2013.01)

(58) Field of Classification Search
CPC ... H04R 25/00; H04R 25/305; H04R 2460/13
See application file for complete search history.

(56) References Cited

U.S. PATENT DOCUMENTS

2010/0272297 A1* 10/2010 Boretzki ................ H04R 25/70 381/312
2015/0128708 A1 5/2015 Ikeda
(Continued)

FOREIGN PATENT DOCUMENTS

CN 103891308 A 6/2014
CN 105141728 A 12/2015
(Continued)

OTHER PUBLICATIONS

International Search Report from International Application No. PCT/CN2020/125634 mailed May 26, 2021.

*Primary Examiner* — Suhan Ni
(74) *Attorney, Agent, or Firm* — Shih IP Law Group, PLLC

(57) ABSTRACT

A method, an apparatus and a system for testing a bone conduction communication device is disclosed. A vibration exciter is disposed at a wearing position of an artificial head model where the bone conduction communication device is located. The method comprises: transmitting a test audio to first and a second digital signal processors; transmitting an audio signal processed by the first digital signal processor to the vibration exciter, and simulating vibration of a bone at a corresponding part by which human generates sound using the vibration exciter, to generate a vibration signal; transmitting an audio signal processed by the second digital signal processor to an artificial mouth and simulating human sound production to generate an acoustic signal; collecting the vibration signal and the sound signal using the bone conduction communication device, and testing the bone
(Continued)

conduction communication device according to the collected vibration signal and sound signal.

6 Claims, 3 Drawing Sheets

(56) References Cited

U.S. PATENT DOCUMENTS

| | | | | |
|---|---|---|---|---|
| 2015/0181357 | A1* | 6/2015 | Krystek | H04R 25/505<br>381/315 |
| 2015/0215710 | A1* | 7/2015 | Francart | H04R 25/70<br>381/326 |
| 2016/0143563 | A1 | 5/2016 | Inagaki | |
| 2017/0142527 | A1* | 5/2017 | Pedersen | H04R 1/1041 |

FOREIGN PATENT DOCUMENTS

| | | | |
|---|---|---|---|
| CN | 106970772 | A | 7/2017 |
| CN | 107071626 | A | 8/2017 |
| CN | 107172548 | A | 9/2017 |
| CN | 108713324 | A | 10/2018 |
| CN | 111065035 | A | 4/2020 |
| CN | 111337120 | A | 6/2020 |
| CN | 111405450 | A | 7/2020 |
| CN | 111432324 | A | 7/2020 |
| CN | 111565354 | A | 8/2020 |

* cited by examiner

METHOD, APPARATUS AND SYSTEM FOR TESTING A BONE CONDUCTION COMMUNICATION DEVICE

The present application claims the priority of Chinese patent application No. 202010953883.3 with the title of "method, apparatus and system for testing a bone conduction communication device" filed in the China Patent Office on Sep. 11, 2020 and all the contents thereof are incorporated to the present application by reference.

TECHNICAL FIELD

The present disclosure relates to a technical field of bone conduction communication device, and particularly to a method, an apparatus and a system for testing a bone conduction communication device.

BACKGROUND ART

The existing voice communication quality evaluation method mainly uses ACQUA (Advanced Communication Quality Analysis) to test 3QUEST which is a voice quality measurement parameter commonly used in an ACQUA testing system. ACQUA is a dual channel signal analysis and signal generation system used for electrical signal measurement. The test process requires the use of an artificial mouth and an artificial ear to broadcast and record relevant testing voice sources. The testing purpose may be realized only when the testing signals are recognized by the artificial mouth or the artificial ear.

However, the inventor founds that, for devices with bone conduction elements or wearable devices where bone conduction elements and air conduction microphones operating together or other related electronic devices, either the voice played by the artificial mouth cannot be collected by the microphone of the bone conduction communication device, or the communication voice played by the loudspeaker of the bone conduction communication device cannot be collected by the artificial ear, as a result, the existing testing scheme cannot achieve the relevant testing of bone conduction communication device.

SUMMARY

In view of the above problem, the main purpose of the present application is to provide a method, an apparatus and a system for testing a bone conduction communication device, to solve the technical problem that the existing test scheme cannot achieve the relevant testing of the bone conduction communication device.

According to a first aspect of the present application, a method for testing a bone conduction communication device is provided, wherein a vibration exciter is provided at a wearing position of an artificial head model where the bone conduction communication device is located, the vibration exciter contacts the bone conduction communication device, the method comprises:

- transmitting a test audio to a first digital signal processor and a second digital signal processor respectively, and the first digital signal processor and the second digital signal processor processing the test audio;
- transmitting an audio signal processed by the first digital signal processor to the vibration exciter, and simulating vibration of a bone at a corresponding part by which human generates sound using the vibration exciter to generate a vibration signal;
- transmitting an audio signal processed by the second digital signal processor to an artificial mouth of the artificial head model, and simulating human sound production using the artificial mouth to generate an acoustic signal; and
- collecting the vibration signal and the audio signal using the bone conduction communication device, and testing the bone conduction communication device according to the vibration signal and the acoustic signal collected by the bone conduction communication device.

According to a second aspect of the present application, an apparatus for testing a bone conduction communication device is provided, comprising:

- a test audio processing unit for transmitting a test audio to a first digital signal processor and a second digital signal processor respectively for processing the test audio by the first digital signal processor and the second digital signal processor;
- a vibration signal generation unit for transmitting an audio signal processed by the first digital signal processor to the vibration exciter, and simulating vibration of a bone at a corresponding part by which human generates sound using the vibration exciter to generate a vibration signal, wherein the vibration exciter is disposed at a wearing position of an artificial head model where the bone conduction communication device is located, and contacts the bone conduction communication device;
- an acoustic signal generation unit for transmitting an audio signal processed by the second digital signal processor to an artificial mouth of the artificial head model, and simulating human sound production using the artificial mouth to generate an acoustic signal; and
- a signal collecting and testing unit for collecting the vibration signal and the audio signal using the bone conduction communication device, and testing the bone conduction communication device according to the vibration signal and acoustic signal collected by the bone conduction communication device.

According to a third aspect of the present application, a system for testing a bone conduction communication device is provided, which comprises: a vibration exciter, an artificial head model, a processor and a memory for storing computer executable instructions,

- wherein the vibration exciter is disposed at a wearing position of the artificial head model where the bone conduction communication device is located, and contacts the bone conduction communication device, and
- wherein the processor executes the above-described method for testing the bone conduction communication device according to the computer executable instructions.

According to a fourth aspect of the present application, a computer-readable storage medium is provided, the computer-readable storage medium stores one or more programs, when the one or more programs are executed by a processor, the above-described method for testing the bone conduction communication device is implemented.

The advantageous effects of the present application are as follows.

According to the method for testing the bone conduction communication device of the embodiment of the present application, before testing, a vibration exciter contacting with the bone conduction communication device is additionally provided in advance at the wearing position of the artificial head model where the bone conduction communication device is located, so that the vibration of bone at the corresponding part by which human generates sound can be simulated by the vibration exciter subsequently. In the test phase, the acquired test audio can be transmitted to the first digital signal processor and the second digital signal processor respectively for processing by the first digital signal processor and the second digital signal processor, wherein the audio signal processed by the first digital signal processor may be transmitted to the vibration exciter, so that the vibration exciter simulates the vibration of the bone at the corresponding part by which human generates sound according to the processed audio signal, and accordingly a vibration signal is generated. The audio signal processed by the second digital signal processor may be transmitted to the artificial mouth of the artificial head model, so that the artificial mouth simulates human sound production, and accordingly acoustic signal is generated. The above process can completely simulate bone vibration and sound production of human mouth when human speaks, and can provide a basis for obtaining accurate testing results subsequently. Finally, the bone conduction communication device collects the vibration signal and the acoustic signal, and the bone conduction communication device is tested according to the collected vibration signal and the acoustic signal, so as to obtain objective test results and to achieve the objective evaluation of the bone conduction communication device.

BRIEF DESCRIPTION OF THE DRAWINGS

By reading the detailed description of the preferred embodiments below, various other advantages and benefits will become clear to those skilled in the art. The drawings are only for the purpose of showing the preferred embodiments and are not considered as a limitation to the present application. Throughout the drawings, the same components are represented by the same reference numerals. In the drawings.

DETAILED DESCRIPTION OF EMBODIMENTS

Exemplary embodiments of the present application will be described in more detail below with reference to the accompanying drawings. Although exemplary embodiments of the present application are illustrated in the accompanying drawings, it should be understood that the present application may be implemented in various forms and should not be limited by the embodiments described herein. On the contrary, these embodiments are provided to understand the application more thoroughly and to completely convey the scope of the present application to those skilled in the art.

The present application additionally provides a vibration exciter used to simulate the vibration of the skin and the bone of the human face in addition to the artificial mouth in the existing testing system, and achieves the testing to the bone conduction communication device through the cooperation of the vibration exciter and the artificial mouth.

Figure 1:
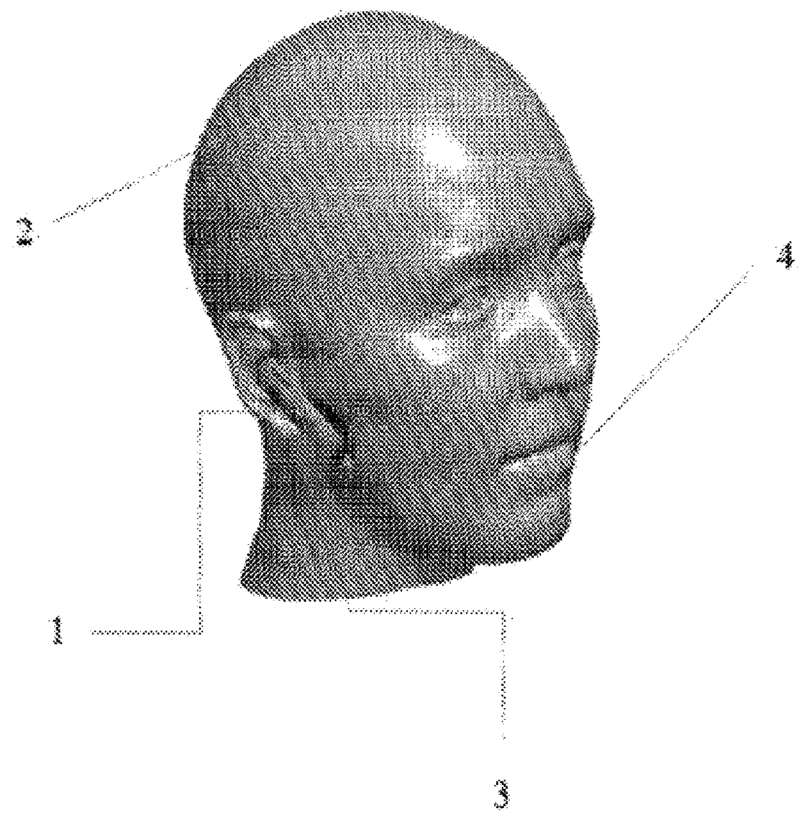
FIG. 1 is a schematic diagram of a disposing position of a vibration exciter in one embodiment of the present application.

As shown in FIG. 1, FIG. 1 is a schematic diagram of the disposing position of a vibration exciter according to one embodiment of the present application. A vibration exciter 3 in contact with the bone conduction communication device 1 is additionally provided at the wearing position of the artificial head model 2 in which the bone conduction communication device 1 is located, and the testing of the bone conduction communication device 1 is achieved by the cooperation of the vibration exciter 3 and the artificial mouth 4. The disposing position of the vibration exciter mainly depends on the position where the bone conduction communication device is located, and the specific position may be flexibly disposed according to the actual testing requirements. For example, if the bone conduction communication device is worn in the ear position, the vibration exciter may also be disposed near the position of the human ear and contact with the bone conduction communication device. If the bone conduction communication deice is required to be worn on the positions such as cheeks, cheekbones or a bridge of nose of the artificial bone model according to the different product forms, the vibration exciter is also need to be disposed at these positions, and to ensure that the vibration exciter is in contact with the bone conduction communication device.

The above-described artificial head model is a concept usually used in the ACQUA testing system in the prior art. Specifically, the artificial head model in the embodiment of the present application may include a plurality of parts such as cheeks, cheekbones, a bridge of nose, a mouth, ears and the like, but not limited to the head position in the physiological meaning. The bone conduction communication device in the embodiment of the present application may be a bone conduction communication headset with a microphone and a loudspeaker, and of course, it may also be other types of bone conduction communication device, which is not specifically limited herein.

Figure 2:
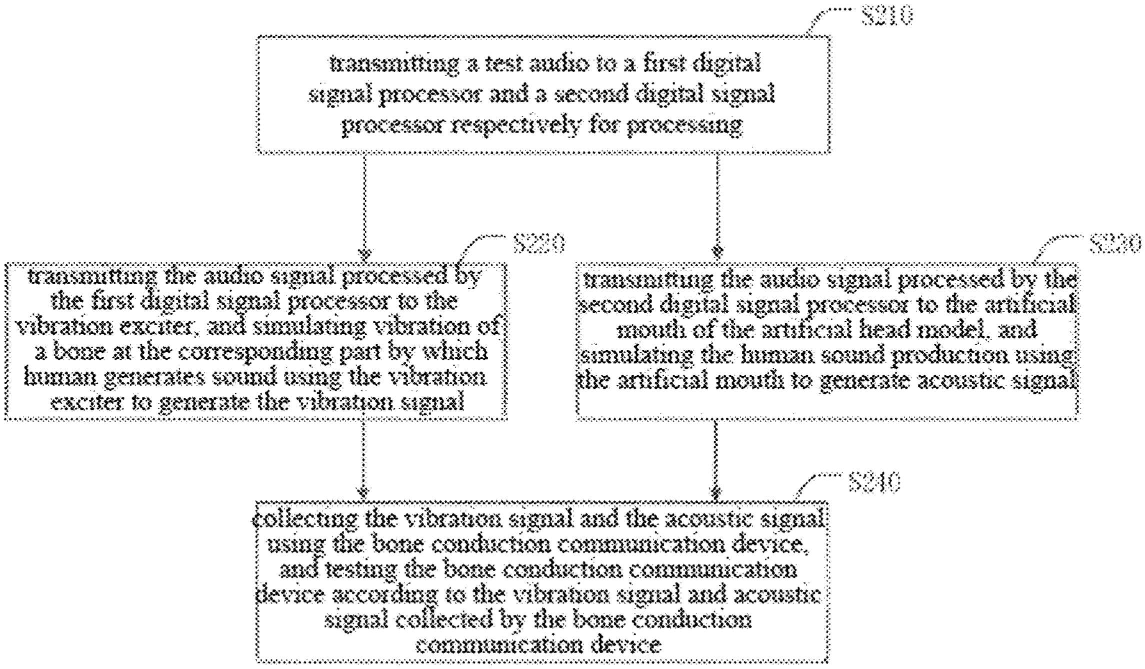
FIG. 2 is a flow chart of a method for testing a bone conduction communication device in one embodiment of the present application.

FIG. 2 shows a flow chart of a method for testing a bone conduction communication device in one embodiment of the present application. Refer to FIG. 2, the bone conduction communication device testing method in the embodiment of the present application specifically includes the following steps of S210 to S240:

Step S210, transmitting the test audio to a first digital signal processor and a second digital signal processor respectively and the first digital signal processor and the second digital signal processor processing the test audio.

When performing the testing to the bone conduction communication device, it is necessary to acquire the audio for testing at first, and then transmit the test audio to the digital signal processor (briefly referred to as DSP) for processing. DSP is a specialized microprocessor, the processing object is commonly to measure, filter or compress real analog signal. Most of the general-purpose microprocessors may also successfully implement digital signal processing algorithms, but dedicated DSP usually has better power efficiency, therefore they are more suitable for portable devices, such as mobile phones and headphones and the like. In the existing ACQUA testing system, DSP may be disposed in an independent measurement front end (MFE), one end of which may be connected to the bone conduction communication device to be tested, and the other end of which may be connected to a host device (PC) in the ACQUA testing system to take charge of the operations such as acquisition, processing and transmission of data and the like. In the embodiment of the present application, two digital signal processors may also be disposed in the above-described independent measurement front end for performing processing, filtering, equalization of signals and the like in real time.

The above-described transmission method may be used for transmitting the test audio to two digital signal processors by means of Bluetooth transmission, and of course, other transmission methods may also be used, which will not be listed herein. The purpose of providing two digital signal processors herein is to ensure the accuracy and efficiency of signal processing by adopting two digital signal processors to perform processing and transmission control respectively, since there are differences existed in the signal processing methods and the transmission efficiency of the vibration signal and the acoustic signal in the embodiment of the present application.

Step S220, transmitting the audio signal processed by the first digital signal processor to the vibration exciter, and simulating the vibration of the bone at the corresponding part by which human generates sound using the vibration exciter to generate the vibration signal.

Step S230, transmitting the audio signal processed by the second digital signal processor to the artificial mouth of the artificial head model, and simulating the human sound production using the artificial mouth to generate acoustic signal.

The above two digital signal processors are referred to as the first digital signal processor (DSP1) and the second digital signal processor (DSP2) respectively for distinguishing them. Among them, DSP1 is mainly used to process the audio signal related to bone vibration in the test audio, and then transmit the processed audio signal to the vibration exciter, so that the vibration exciter can simulate the vibration of the bone at the corresponding parts by which human generates sound, and correspondingly generate vibration signal.

DSP2 is mainly used to process audio signal related to sound among the same test audio, and then transmits the processed audio signal to the artificial mouth of the artificial head model, simulate the sound generation of the human mouth by using the artificial mouth, and generate acoustic signal correspondingly.

Step S240, collecting the vibration signal and the acoustic signal using the bone conduction communication device, and testing the bone conduction communication device according to the vibration signal and audio signal collected by the bone conduction communication device.

For the vibration signal generated by using the vibration exciter to simulate vibration of the bone at corresponding part by which human generates sound and the acoustic signal generated by using the artificial mouth to simulate human sound production, the microphone disposed in the bone conduction communication device can collect the audio signal generated by the artificial mouth of the artificial head model, and the bone conduction sensor disposed in the bone conduction communication device can collect the vibration signal generated by the vibration of the vibration exciter disposed on the artificial head model. Through the above process, it can completely simulate bone vibration and the sound production of human mouth when human speaks, which provides a basis for obtaining accurate and objective testing results subsequently. Finally, the bone conduction communication device can be tested according to the acoustic signal and vibration signal collected by the bone conduction communication device, and correspondingly the objective test results can be obtained to achieve the objective evaluation of the bone conduction communication device.

In one embodiment of the present application, the processing to the test audio by the first digital signal processor includes: acquiring an equalizer curve corresponding to the wearing position of the vibration exciter; and processing the test audio according to the equalizer curve.

In the embodiment of the present application, when using the first digital signal processor to process the test audio, the equalizer curve (briefly referred to as Eq curve) corresponding to the wearing position of the vibration exciter may be acquired at first. The equalizer curve is a curve that can adjust amplification amount of the electrical signal of various frequency components respectively, and the function thereof is to increase a specific frequency or attenuate a specific frequency, and the equalizer curve is mainly used to allow the first digital signal processor to perform the signal frequency processing and the like of the signal related to bone vibration in the test audio according to the equalizer curve in the embodiment of the application.

Since the equalizer curves corresponding to different wearing positions are usually different, it is necessary to call the equalizer curve corresponding to the wearing position of the vibration exciter as required when using the first digital signal processor to process the test audio. For example, if the vibration exciter is disposed at the cheeks, the equalizer curve corresponding to the cheek is called.

In one embodiment of the present application, acquiring the equalizer curve corresponding to the wearing position of the vibration exciter includes: collecting a plurality of frequency response curves of the vibrations at different wearing positions of the human head when human generates sound; performing normalizing processing to the plurality of frequency response curves of the vibrations at the wearing positions, to obtain equalizer curves corresponding to the wearing positions respectively and to store the equalizer curves; and obtaining the equalizer curve corresponding to the wearing position of the vibration exciter according to the wearing position of the vibration exciter at the artificial head model.

In the embodiment of the present application, when acquiring the equalizer curves corresponding to different wearing positions, a plurality of frequency response curves of the vibration at different wearing positions of human head when the human mouth generates a large number of sound at first. The frequency response curve herein is the Frequency Response curve, which can be simply understood as the response of a system to the input signal with different frequencies. Taking the bone conduction telephone headset device as an example, "headset frequency response" is configured to output a stable signal at 0-20 KHZ through the signal transmitter in the electroacoustic tester, and then capture the signal sent by the headset through the receiving microphone, and finally be presented in the form of decibel dB logarithm value, which is called "frequency response curve", wherein frequency is the horizontal coordinate and response (Relative Response [dB]) is the vertical coordinate.

In general, the frequency response curves of bone conduction communication device corresponding to different wearing positions are different, so it is necessary to obtain a plurality of frequency response curves of vibrations at different wearing positions respectively, and then perform the normalized matching processing to the plurality of frequency response curves of vibrations at wearing positions to obtain the equalizer curve corresponding to each wearing position, and then store these equalizer curves to the first digital signal processor, to facilitate subsequent calls as needed.

In one embodiment of the present application, the processing to the test audio by the second digital signal processor includes: performing delay processing to the test audio frequency, so that the acoustic signal output from the artificial mouth and the vibration signal output from the vibration exciter at the same time arrive at the bone conduction communication device at the same time.

As described in the above, since the processing of vibration signal and the processing of the acoustic signal are different in the present application, two digital signal processors are adopted for processing and control respectively. The processing of the acoustic signal is relatively simple in the embodiment of the present application. After the acoustic signal is processed by the second digital signal processor, the sound can be directly output through the artificial mouth, while the vibration signal requires a series of processing in the first digital signal processor according to the equalizer curves. After the processing of the vibration signal, the vibration exciter needs to simulate the vibration of the bone by which human speaks to generate the vibration signal, therefore, the processing of the vibration signal is relatively complex and consumes relatively much time in the embodiment of the present application. In order to ensure that the acoustic signal generated by the artificial mouth and the vibration signal generated by the vibration exciter can reach the bone conduction communication device synchronously after the same test acoustic source is subjected to the above processing, and in order to ensure the synchronization of signal transmission, operations such as delay processing may be performed on the test audio received in the second digital signal processor, so as to ensure the synchronization and consistency of the vibration signal and the acoustic signal collected by the bone conduction communication device subsequently, and improve the accuracy of the subsequent test results.

In one embodiment of the present application, testing the bone conduction communication device according to the vibration signal and the acoustic signal collected by the bone conduction communication device includes: performing synthesis processing to the vibration signal and the acoustic signal collected by the bone conduction communication device to obtain a synthetic audio signal; and comparing the synthetic audio signal with a standard audio signal to obtain a test result about whether the bone conduction communication device is up to standard.

When testing the bone conduction communication device according to the vibration signal and the acoustic signal collected by the bone conduction communication device, the present embodiment may use the synthesis algorithm in the prior art to perform the synthesize processing to the vibration signal and the acoustic signal collected by the bone conduction communication device, to obtain the synthetic audio signal, and then compare the synthetic audio signal with the standard audio signal measured by the qualified product to calculate the deviation between the synthetic audio signal and the standard audio signal. If the deviation is within an acceptable deviation range, the test result of the bone conduction communication device may be considered as up to standard; and if the deviation is not within the acceptable deviation range, the test result of the bone conduction communication device may be considered as not up to standard.

Of course, in addition to the above testing methods, those skilled in the art may also select other testing methods flexibly according to the actual requirements, for example, the vibration signal collected by the bone conduction communication device may be directly compared with the preset standard vibration signal, and the acoustic signal collected by the bone conduction communication device may be directly compared with the preset standard acoustic signal, to obtain the test results.

Figure 3:
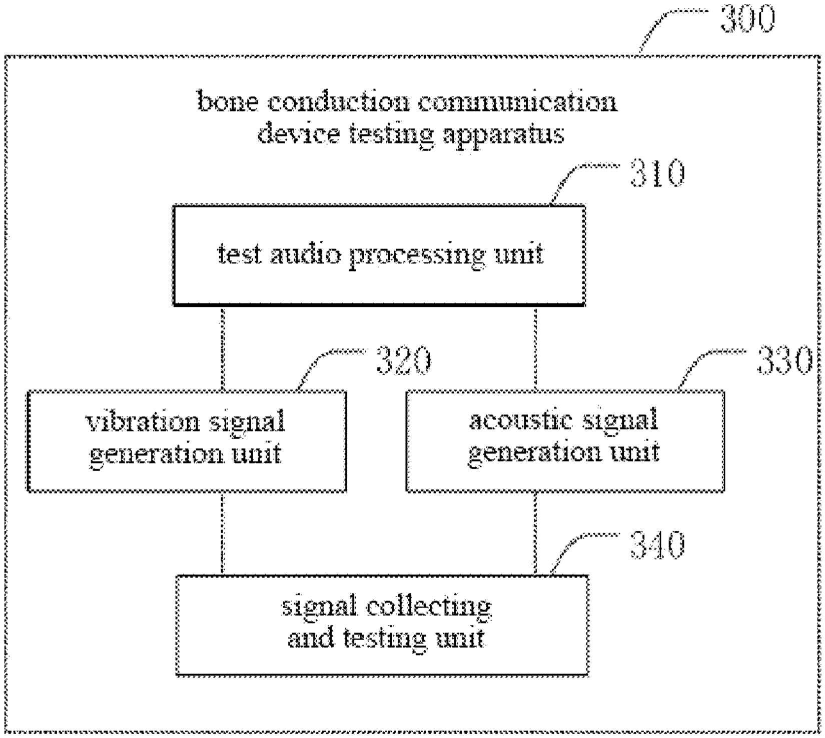
FIG. 3 is a functional block diagram of an apparatus for testing a bone conduction communication device in one embodiment of the present application.

Having the same technical concept as the above described bone conduction communication device testing method, the embodiment of the application further provides an apparatus for testing a bone conduction communication device. FIG. 3 shows a functional block diagram of an apparatus for testing a bone conduction communication device in one embodiment of the present application. Refer to FIG. 3, a vibration exciter in contact with a bone conduction communication device is provided at the wearing position of the artificial head model where the bone conduction communication device is located. The bone conduction communication device testing apparatus 300 includes: a test audio processing unit 310, a vibration signal generation unit 320, an audio signal generation unit 330 and a signal collecting and testing unit 340.

Wherein, the test audio processing unit 310 is used for transmitting the test audio to a first digital signal processor and a second digital signal processor respectively for processing the test audio by the first digital signal processor and the second digital signal processor.

The vibration signal generation unit 320 is used for transmitting the audio signal processed by the first digital signal processor to the vibration exciter, and simulating the vibration of the bone at the corresponding part when for processing the test audio by the first digital signal processor and the second digital signal processor human generates voice by using the vibration exciter, to generate the vibration signal.

The audio signal generation unit 330 is used for transmitting the audio signal processed by the second digital signal processor to the artificial mouth of the artificial head module, and simulating human sound production using the artificial mouth, to generate an acoustic signal.

The signal collecting and testing unit 340 is used for collecting the vibration signal and the acoustic signal using the bone conduction communication device, and testing the bone conduction communication device according to the vibration signal and the acoustic signal collected by the bone conduction communication device.

In one embodiment of the present application, the processing to the test audio by the first digital signal processor includes: acquiring the equalizer curve corresponding to the wearing position of the vibration exciter; and processing the test audio according to the equalizer curves.

In one embodiment of the present application, acquiring the equalizer curve corresponding to the wearing position of the vibration exciter includes: collecting a plurality of frequency response curves of vibrations at different wearing positions of a human head when human generates sound; performing normalizing processing to the plurality of frequency response curves of the vibrations at the wearing positions, to obtain the equalizer curve corresponding to the wearing positions respectively and to store the equalizer curves; and querying and obtaining the equalizer curve corresponding to the wearing position of the vibration exciter according to the wearing position of the vibration exciter at the artificial head model.

In one embodiment of the present application, the processing to the test audio by the second digital signal processor includes: performing delay processing to the test audio frequency, so that the audio signal output from the artificial mouth and the vibration signal output from the vibration exciter at the same time arrive at the bone conduction communication device synchronously.

In one embodiment of the present application, the signal collecting and testing unit 340 is specifically used for performing synthesize processing to the vibration signal and the acoustic signal collected by the bone conduction communication device to obtain a synthetic audio signal; and comparing the synthetic audio signal with the standard audio signal to obtain a test result about whether the bone conduction communication device is up to standard.

It should be noted that the embodiment of the present application also provide a system for testing bone conduction communication device. On the hardware level, the bone conduction communication device testing system includes a vibration exciter, an artificial head model, a processor and a memory for storing computer executable instructions. The memory may include storage, such as high-speed random access memory (RAM), and may include non-volatile memory, such as at least one disk memory and the like. Of course, the bone conduction communication device testing system may further include hardware required by other services.

The processor and the memory may be connected to each other through an internal bus. The internal bus may be an ISA (Industrial Standard Architecture) bus, PCI (Peripheral Component Interconnect) bus or EISA (Extended Industry Standard Architecture) bus and the like. The bus may be classified as an address bus, a data bus, a control bus and the like.

The memory is used for storing computer executable instructions. The memory provides computer executable instructions to the processor through the internal bus.

The processor is used for executing the computer executable instructions stored in the memory and is specifically used for achieving the following operations:

- transmitting the test audio to the first digital signal processor and the second digital signal processor respectively, and the first digital signal processor and the second digital signal processor processing the test audio;
- transmitting the audio signal processed by the first digital signal processor to the vibration exciter, and simulate the vibration of the bone at the corresponding part by which human generates sound using the vibration exciter, to generate a vibration signal;
- transmitting the audio signal processed by the second digital signal processor to the artificial mouth of the artificial head model, and simulating human sound production using the artificial mouth to generate acoustic signal; and
- collecting the vibration signal and the acoustic signal using the bone conduction communication device, and testing the bone conduction communication device according to the vibration signal and the audio signal collected by the bone conduction communication device.

The functions performed by the apparatus for testing the bone conduction communication device which is disclosed by the embodiment as shown in FIG. 3 of the present application are either applied to the processor or implemented by the processor. The processor may be an integrated circuit chip with signal processing capability. In the implementation process, each step of the above method may be achieved by an integrated logic circuit of hardware in the processor or instructions in the form of software. The above processor may be a general-purpose processor, including central processing unit (CPU), network processor (NP) and the like, and may also be Digital Signal Processor (DSP), Application Specific Integrated Circuit (ASIC), Field-Programmable Gate Array (FPGA) or other programmable logic devices, discrete gate or transistor logic devices, discrete hardware components. Each method, step and logic block diagram disclosed by the embodiment of the present application can be implemented or executed. The general-purpose processor may be a microprocessor or the processor may also be any conventional processor and the like. The steps of the method disclosed in combination with the embodiments of the present application may be directly embodied to be executed and achieved by the hardware decoding processor or by the combination of hardware and software modules in the decoding processor. Software modules may be positioned in a developed storage medium in the art such as random access memory, flash memory, read-only memory, programmable read-only memory or electrically erasable programmable memory, register, etc. The storage medium is positioned in the memory, and the processor reads the information in the memory, to achieve the steps of the above method in combination with hardware thereof.

The system for testing the bone conduction communication device may also execute the steps of the method for testing the bone conduction communication device in FIG. 2, and realize the functions of the method for testing the bone conduction communication device in the embodiment showed in FIG. 2. It will not be repeated herein again in the embodiment of the present application.

The embodiment of the present application also provides a computer readable storage medium, which stores one or more programs. The above-described method for testing bone conduction communication device is implemented when the one or more programs are executed by the processor, and the one or more programs are specifically used to execute:

- transmitting the test audio to a first digital signal processor and a second digital signal processor respectively, and the first digital signal processor and the second digital signal processor processing the test audio;
- transmitting the audio signal processed by the first digital signal processor to the vibration exciter, and simulating the vibration of the bone at the corresponding part by which human generates sound using the vibration exciter, to generate the vibration signal;
- transmitting the audio signal processed by the second digital signal processor to the artificial mouth of the artificial head model, and simulating the human sound production using the artificial mouth, to generate acoustic signal; and
- collecting the vibration signal and the audio signal using the bone conduction communication device, and testing the bone conduction communication device according to the vibration signal and acoustic signal collected by the bone conduction communication device.

Those skilled in the art should understand that the embodiments of the present disclosure may be provided as a method, a system, or a computer program product. Therefore, the present disclosure may take the form of an embodiment of complete hardware, an embodiment of complete software, or an embodiment combining software and hardware. Furthermore, the present disclosure may take the form of a computer program product implemented on one or more computer applicable storage media (including but not limited to disk memory, CD-ROM, optical memory, etc.) including computer applicable program codes.

The present disclosure is described with reference to the flow chart and/or block diagram of the method, device (system), and computer program product according to the embodiments of the present disclosure. It should be understood that each flow and/or block in the flow chart and/or block diagram and the combination of flow and/or block in the flow chart and/or block diagram may be realized by computer program instructions. These computer program instructions may be provided to a processor of a general-purpose computer, a special purpose computer, an embedded processor or other programmable data processing device to generate a machine, so that instructions executed by the processor of computer or other programmable data processing device generate means for implementing functions specified in one or more flows of a flowchart and/or one or more blocks of a block diagram.

These computer program instructions may also be stored in a computer readable memory that can guide a computer or other programmable data processing device to operate in a specific way, so that the instructions stored in the computer readable memory generate a manufacture product including an instruction device which implements the functions specified in one or more flows of a flowchart and/or one or more blocks of a block diagram.

These computer program instructions may also be loaded onto a computer or other programmable data processing device, so that a series of operating steps can be executed on the computer or other programmable device to generate the processing implemented by computer, therefore instructions executed on a computer or other programmable device provide steps for realizing the functions specified in one or more flows of a flowchart and/or one or more blocks of a block diagram.

In one typical configuration, a computing device includes one or more processors (CPU), input/output interfaces, network interfaces and memory.

Memory may include forms such as non-permanent memory, random access memory (RAM) and/or non-volatile memory in a computer readable media, such as read only memory (ROM) or flash memory (flash RAM). Memory is an example of computer readable media.

Computer readable media includes permanent and non-permanent, removable and non-removable media, and information storage may be realized by any method or technology. The information may be computer readable instructions, data structures, modules of programs, or other data. Examples of computer storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only optical disk read-only memory (CD-ROM) Digital multi-function optical disk (DVD) or other optical storage, magnetic cassette tape, tape magnetic disk storage or other magnetic storage devices or any other non-transmission media, and the computer storage media may be used to store information that can be accessed by computing device. According to the defining herein, computer readable media do not include temporary computer readable media (transitory media), such as modulated data signals and carriers.

It should also be noted that the terms "including", "comprising" or any other variant thereof are intended to cover the non-exclusive inclusion, so that processes, methods, goods or devices including a series of elements not only include those elements, but also include other elements that have not been explicitly listed or are inherent in these processes, methods, goods or devices. In the case where there are no more restrictions, the elements defined by the statement "including one . . . " do not exclude the existence of other identical elements in the processes, methods, goods or devices including the elements.

It should be understand to those skilled in the art that the embodiments of the present application may be provided as methods, systems or computer program products. Therefore, the present application may take the form of a complete hardware embodiment, a complete software embodiment, or an embodiment combining software and hardware. Furthermore, the present application may take the form of a computer program product implemented on one or more computer applicable storage media (including but not limited to disk memory, CD-ROM, optical memory, etc.) characterized by including computer applicable program codes.

The above is only the embodiments of the present application, and is not used to limit the present application. For those skilled in the art, the present application may have various changes and variations. Any modification, equivalent replacement, improvement, etc. made within the spirit and principle of the present application should be included in the scope of claims of the present application.

What is claimed is:

1. A method for testing a bone conduction communication device, wherein a vibration exciter is provided at a wearing position of an artificial head model where the bone conduction communication device is located, the vibration exciter contacts the bone conduction communication device, the method for testing the bone conduction communication device, comprises:

transmitting a test audio to a first digital signal processor and a second digital signal processor respectively, and the first digital signal processor and the second digital signal processor processing the test audio;

transmitting an audio signal processed by the first digital signal processor to the vibration exciter, and simulating vibration of a bone at a corresponding part by which human generates sound using the vibration exciter, to generate a vibration signal;

transmitting an audio signal processed by the second digital signal processor to an artificial mouth of the artificial head model, and simulating human sound production using the artificial mouth, to generate an acoustic signal; and collecting the vibration signal and the acoustic signal using the bone conduction communication device, and testing the bone conduction communication device according to the vibration signal and the acoustic signal collected by the bone conduction communication device wherein the processing the test audio by the first digital signal processor comprises:

acquiring an equalizer curve corresponding to the wearing position of the vibration exciter; and processing the test audio according to the equalizer curve, and wherein the acquiring the equalizer curve corresponding to the wearing position of the vibration exciter comprises:

collecting a plurality of frequency response curves of vibrations at different wearing positions of a human head when human generates sound;

performing normalizing processing to the plurality of frequency response curves of the vibrations at the wearing positions, to obtain equalizer curves corresponding to the wearing positions respectively and to store the equalizer curves; and obtaining the equalizer curve corresponding to the wearing position of the vibration exciter according to the wearing position of the vibration exciter at the artificial head model.

2. The method according to claim 1, wherein processing the test audio by the second digital signal processor comprises:

performing delay processing to the test audio, so that the acoustic signal output from the artificial mouth and the vibration signal output from the vibration exciter at the same time arrive at the bone conduction communication device at the same time.

3. The method according to claim 1, wherein testing the bone conduction communication device according to the vibration signal and the acoustic signal collected by the bone conduction communication device comprises:

performing synthesis processing to the vibration signal and the acoustic signal collected by the bone conduction communication device to obtain a synthetic audio signal; and comparing the synthetic audio signal with a standard audio signal, to obtain a test result about whether the bone conduction communication device meets standard.

4. A system for testing a bone conduction communication device, comprising a vibration exciter, an artificial head model, a processor and a memory for storing computer executable instructions, wherein the vibration exciter is disposed at a wearing position of the artificial head model where a bone conduction communication device is located and contacts the bone conduction communication device, and wherein the processor executes the method for testing the bone conduction communication device of claim 1 according to the computer executable instructions.

5. An apparatus for testing a bone conduction communication device, comprising:

a test audio processing unit for transmitting a test audio to a first digital signal processor and a second digital signal processor respectively for processing the test audio by the first digital signal processor and the second digital signal processor;

a vibration signal generation unit for transmitting an audio signal processed by the first digital signal processor to the vibration exciter, and simulating vibration of a bone at a corresponding part by which human generates sound using the vibration exciter, to generate a vibration signal, wherein the vibration exciter is disposed at a wearing position of an artificial head model where the bone conduction communication device is located and contacts the bone conduction communication device;

an acoustic signal generation unit for transmitting an audio signal processed by the second digital signal processor to an artificial mouth of the artificial head model, and simulating human sound production using the artificial mouth, to generate an acoustic signal; and a signal collecting and testing unit for collecting the vibration signal and the acoustic signal using the bone conduction communication device, and testing the bone conduction communication device according to the vibration signal and acoustic signal collected by the bone conduction communication device, wherein the processing the test audio by the first digital signal processor comprises:

acquiring an equalizer curve corresponding to the wearing position of the vibration exciter; and processing the test audio according to the equalizer curve, and wherein the acquiring the equalizer curve corresponding to the wearing position of the vibration exciter comprises:

collecting a plurality of frequency response curves of vibrations at different wearing positions of a human head when human generates sound;

performing normalizing processing to the plurality of frequency response curves of the vibrations at the wearing positions, to obtain the equalizer curve corresponding to the wearing positions respectively and to store the equalizer curves; and obtaining the equalizer curve corresponding to the wearing position of the vibration exciter according to the wearing position of the vibration exciter at the artificial head model.

6. The apparatus according to claim 5, wherein the processing to the test audio by the second digital signal processor comprises:

performing delay processing to the test audio frequency, so that the acoustic signal output from the artificial mouth and the vibration signal output from the vibration exciter at the same time arrive at the bone conduction communication device at the same time.

* * * * *